(12) United States Patent
Siebens

(10) Patent No.: US 9,124,015 B2
(45) Date of Patent: Sep. 1, 2015

(54) ELECTRICAL CONNECTOR WITH SACRIFICIAL APPENDAGE AND A GROUNDING ELEMENT

(71) Applicant: Thomas & Betts International, Inc., Wilmington, DE (US)

(72) Inventor: Larry N. Siebens, Asbury, NJ (US)

(73) Assignee: THOMAS & BETTS INTERNATIONAL LLC, Wilmington, DE (US)

( * ) Notice: Subject to any disclaimer, the term of this patent is extended or adjusted under 35 U.S.C. 154(b) by 28 days.

(21) Appl. No.: 14/075,222

(22) Filed: Nov. 8, 2013

(65) Prior Publication Data

US 2014/0065867 A1 Mar. 6, 2014

Related U.S. Application Data

(63) Continuation-in-part of application No. 13/461,922, filed on May 2, 2012, now Pat. No. 8,616,908, which is a continuation-in-part of application No. 13/038,955, filed on Mar. 2, 2011, now Pat. No. 8,172,596.

(60) Provisional application No. 61/309,919, filed on Mar. 3, 2010.

(51) Int. Cl.
| | |
|---|---|
| *H01R 13/62* | (2006.01) |
| *H01R 13/40* | (2006.01) |
| *H01R 13/639* | (2006.01) |
| *H01R 13/443* | (2006.01) |
| *H01R 13/52* | (2006.01) |
| *H02G 15/064* | (2006.01) |
| *H02G 15/103* | (2006.01) |

(52) U.S. Cl.
CPC .............. *H01R 13/40* (2013.01); *H01R 13/443* (2013.01); *H01R 13/5213* (2013.01); *H01R 13/6397* (2013.01); *H02G 15/064* (2013.01); *H02G 15/103* (2013.01)

(58) Field of Classification Search
USPC .......................................... 439/301–304, 108
See application file for complete search history.

(56) References Cited

U.S. PATENT DOCUMENTS

| | | | |
|---|---|---|---|
| 3,883,208 A | 5/1975 | Sankey et al. | |
| 3,959,869 A | 6/1976 | Wyman et al. | |
| 4,202,591 A | 5/1980 | Borgstrom | |
| 7,901,243 B1 | 3/2011 | Yaworski | |
| 8,172,596 B2* | 5/2012 | Siebens | 439/301 |
| 8,597,040 B2* | 12/2013 | Siebens et al. | 439/301 |
| 8,616,908 B2* | 12/2013 | Siebens | 439/301 |

(Continued)

*Primary Examiner* — Chandrika Prasad
(74) *Attorney, Agent, or Firm* — Snyder, Clark, Lesch & Chung, LLP

(57) ABSTRACT

An electrical connector assembly may include a yoke that includes an outer housing; and a central conductor provided within the outer housing, wherein the central conductor comprises at least three outwardly extending portions. A first outwardly extending portion and a second outwardly extending portion are operatively coupled to first and second power cables, respectively. A third outwardly extending portion comprises a tap configured to interchangeably interface with a sacrificial appendage and a grounding element. When the sacrificial appendage is installed on the tap, the sacrificial appendage is configured to be cut through to confirm that the electrical connector assembly is de-energized. When the grounding element is installed on the tap, the grounding element is configured for attachment to a grounded hot line clamp to ground the electrical connector assembly.

20 Claims, 16 Drawing Sheets

(56) References Cited

U.S. PATENT DOCUMENTS

| | | | |
|---|---|---|---|
| 8,651,894 B1 * | 2/2014 | Zhang | 439/517 |
| 2009/0108847 A1 | 4/2009 | Hughes et al. | |
| 2012/0264321 A1 | 10/2012 | Siebens et al. | |
| 2014/0213090 A1 * | 7/2014 | Todd et al. | 439/301 |

* cited by examiner

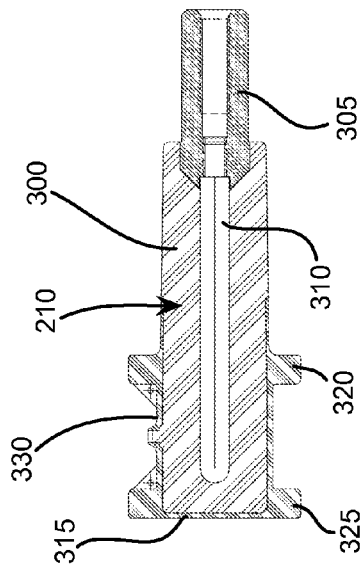
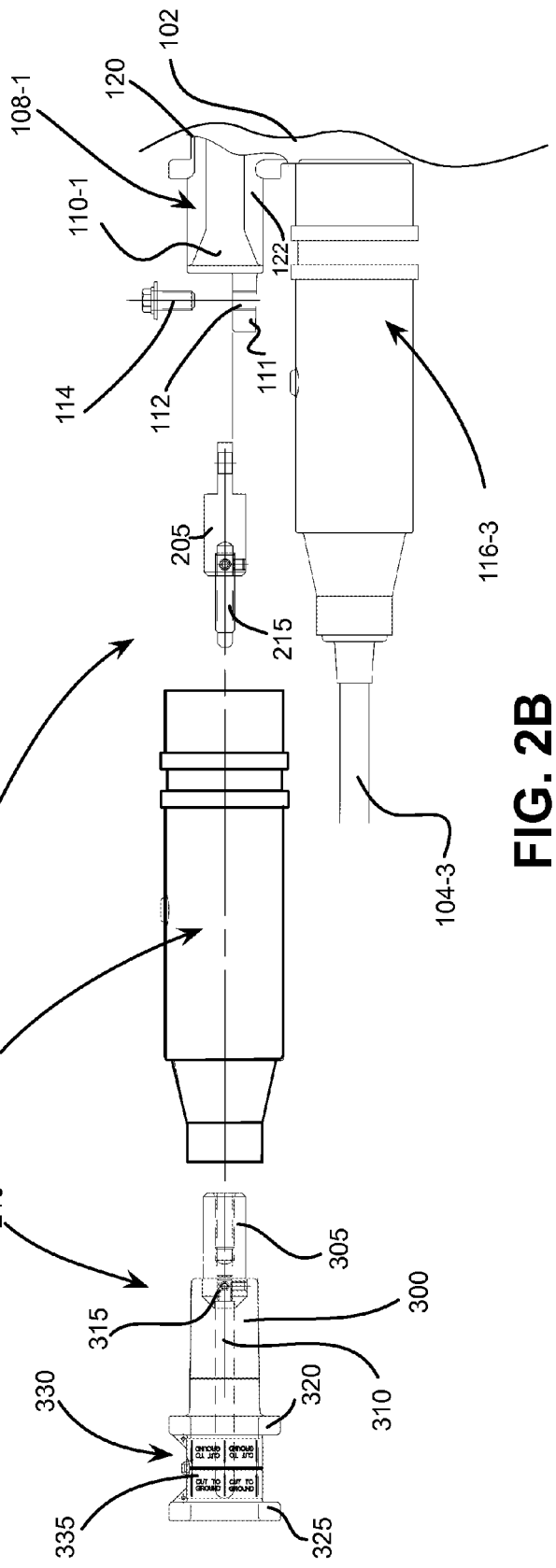
FIG. 3
FIG. 2B

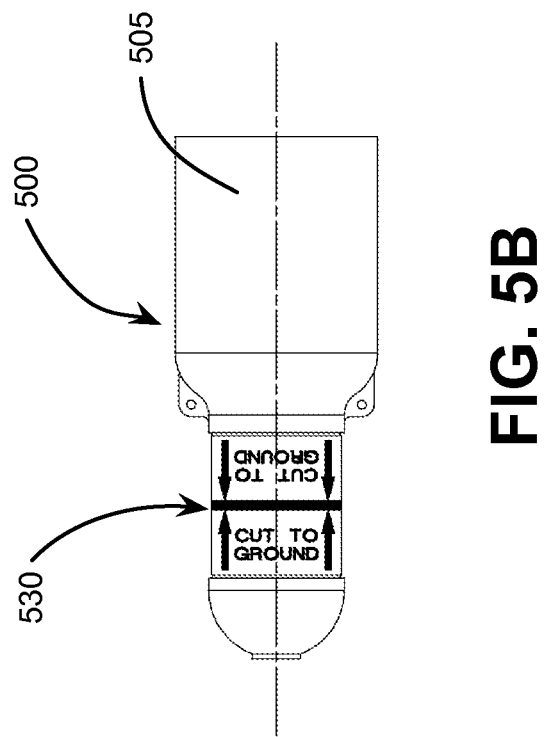
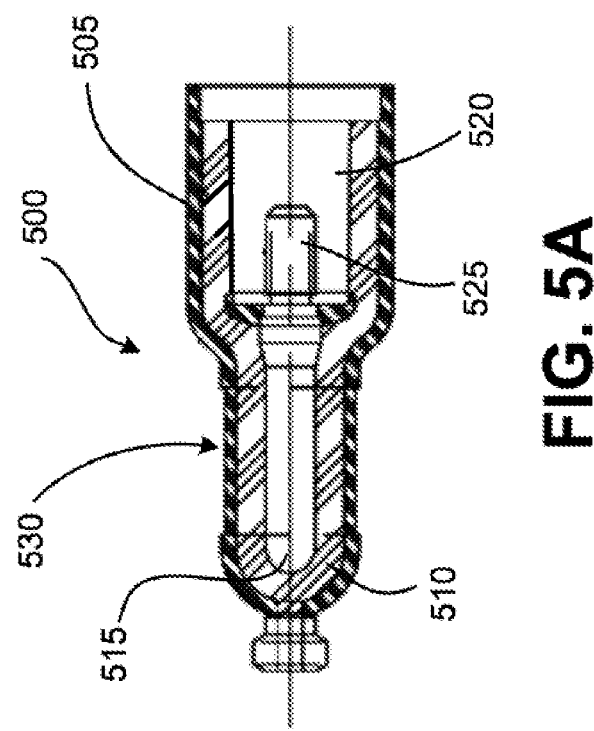
FIG. 5B
FIG. 5A

US 9,124,015 B2

ELECTRICAL CONNECTOR WITH SACRIFICIAL APPENDAGE AND A GROUNDING ELEMENT

CROSS-REFERENCE TO RELATED APPLICATION

This application is a continuation-in-part application of and claims priority to U.S. patent application Ser. No. 13/461, 922, filed May 2, 2012, which is a continuation-in-part application of U.S. patent application Ser. No. 13/038,955, filed Mar. 2, 2011, now U.S. Pat. No. 8,172,596, which is a non-provisional application claiming priority under 35 U.S.C. §119, based on U.S. Provisional Patent Application No. 61/309,919 filed Mar. 3, 2010, the disclosures of which are hereby incorporated by reference herein.

BACKGROUND OF THE INVENTION

The present invention relates to electrical cable connectors, such as splicing connectors for joining two or more electrical cables, loadbreak connectors, and deadbreak connectors. More particularly, aspects described herein relate to an electrical cable connector that includes a feature for enabling personnel to ensure that the connector is de-energized.

High and medium voltage electrical connectors and components typically operate in the 15 to 35 kilovolt (kV) range. Because such voltages are potentially very dangerous, it is typically necessary for personnel to confirm that the power is disconnected before commencing work or repair. Known methods of visual or physical de-energizing confirmation include "spiking the cable," in which a grounded spike is driven thru the cable and into the conductor or a grounded hydraulic cable cutter is used to physically cut the cable in half.

Unfortunately, after a cable is "spiked," the utility is required to replace the cable or increase its length by adding a splice and additional cable in order to reconnect to the system. This is costly and time consuming.

BRIEF DESCRIPTION OF THE DRAWINGS

FIG. 2B illustrates the power cable splicing connector of FIG. 2A in an exploded (e.g., unassembled) view;

FIG. 3 is a cross-sectional view of the sacrificial adapter of FIGS. 2A and 2B;

FIG. 5A is a cross-sectional view of an alternative sacrificial appendage for use with the splicing connector of FIGS. 4A and 4B;

FIG. 5B is side view of the alternative sacrificial appendage of FIG. 5A;

DETAILED DESCRIPTION OF THE PREFERRED EMBODIMENTS

The following detailed description refers to the accompanying drawings. The same reference numbers in different drawings may identify the same or similar elements.

Figure 1A:
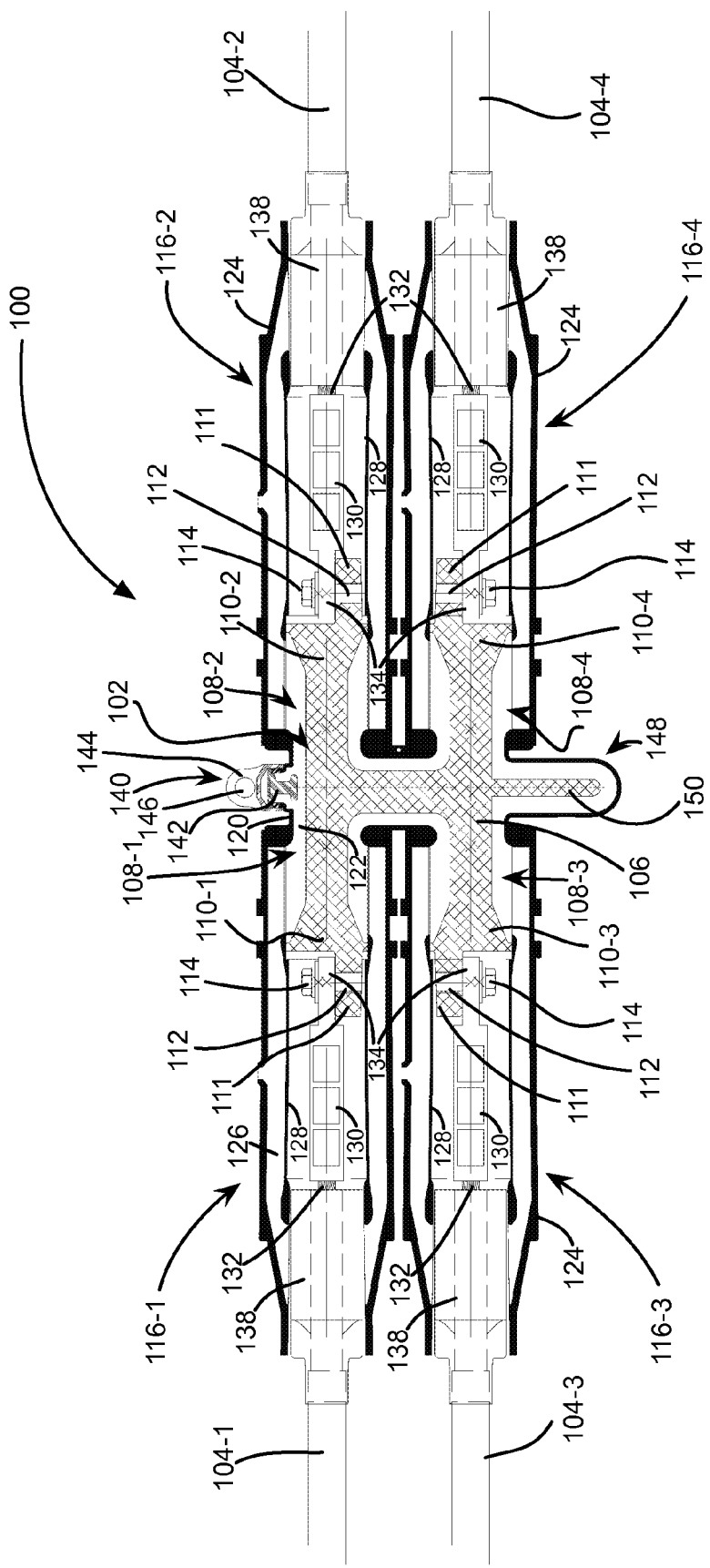
FIG. 1A is a schematic cross-sectional diagram illustrating a power cable splicing connector consistent with implementations described herein.

FIG. 1A is a schematic cross-sectional diagram illustrating a power cable splicing connector 100 configured in a manner consistent with implementations described herein. As shown in FIG. 1, power cable splicing connector 100 may include a four-way yoke 102 for enabling connection of power cables 104-1, 104-2, 104-3, and 104-4 (collectively "power cables 104," and individually "power cable 104-x"). For example, power cable 104-1 may be a supply cable and cables 104-2 to 104-4 may be load cables. Other types of power cable splicing connectors may be configured in accordance with implementations described herein, such as three-way yoke connectors, two-way connectors, etc.

In one implementation, yoke 102 of power cable splicing connector 100 may include a central conductor 106 and number of splice openings 108-1 to 108-4 (collectively "splice openings 108," and individually "splice opening 108-x"). Central conductor 106 may be formed of a suitably conductive material, such as copper, aluminum, or other conductive alloy. Further, as shown in FIG. 1, central conductor 106 may include outwardly extending portions 110-1 to 110-4 (collectively "outwardly extending portion 110," and individually "outwardly extending portion 110-x") that project from respective splice openings 108-x. As described in additional detail below, central conductor 106 may connect each of power cables 104-x to each other power cable 104-x, such that voltage applied to one cable is transferred to each other cable.

Outwardly extending portions 110 may be configured to receive connector portions of power cables 104. For example, each extending portion 110-x may include a spade portion 111 having a threaded bore 112 therein for receiving a connector bolt 114. In one configuration, as illustrated in FIG. 1, outwardly extending portion 110-1 extends oppositely from outwardly extending portion 110-2 and outwardly extending portion 110-3 extends oppositely from outwardly extending portion 110-4. Furthermore, outwardly extending portions 110-1 and 110-2 may be oriented parallel to outwardly extending portions 110-3 and 110-4, respectively. Such a configuration may provide for compact splicing or splitting of a power supply cable (e.g., cable 104-1) to multiple load cables (e.g., cables 104-2 to 104-4).

As shown in FIG. 1A, each splice opening 108-$x$ includes a cable receptacle interface that includes a substantially cylindrical flange or cuff portion configured to frictionally engage a cable receptacle 116-$x$ (individually, cable receptacle 116-$x$, or collectively, cable receptacles 116). For example, an inside diameter of a forward end of cable receptacle 116-$x$ may be sized to frictionally engage the cuff portion of splice opening 108-$x$. Each cable receptacle 116 be substantially cylindrical and may be configured to surround and protect an interface between power cables 104 and extending portions 110.

Yoke 102 may include an outer shield 120 formed from, for example, a peroxide-cured synthetic rubber, commonly referred to as EPDM (ethylene-propylene-dienemonomer). Within shield 120, yoke 102 may include an insulative inner housing 122, typically molded from an insulative rubber or epoxy material. Central conductor 106 may be enclosed within insulative inner housing 122.

Regarding cable receptacles 116, each cable receptacle 116-$x$ may include an EPDM outer shield 124 and an insulative inner housing 126, typically molded from an insulative rubber or epoxy material. Cable receptacle 116-$x$ further includes a conductive or semi-conductive insert 128 having a bore therethrough. Upon assembly, cable receptacle 116 surrounds the interface between power cable 104-$x$ and extending portion 110-$x$. In one implementation, a forward end of insert 128 may be configured to frictionally engage outwardly extending portion 110-$x$ of central conductor 106 upon assembly of splicing connector 100, thereby ensuring the electrical integrity of splicing connector 100.

Referring to power cables 104, a forward end of each power cable 104-$x$ may be prepared by connecting power cable 104 to a crimp connector 130. Crimp connector 130 may include a substantially cylindrical assembly configured to receive a cable conductor 132 of power cable 104-$x$ therein. During preparing of power cable 104-$x$, a portion of crimp connector 130 may be physically deformed (e.g., crimped) to fasten crimp connector 130 to cable conductor 132. Crimp connector portion 130 may include a forward spade portion 134 configured to be securely fastened to a spade portion 111 of outwardly extending portion 110-$x$ of central conductor 106. For example, forward spade portion 134 may include a bore (not shown) configured to align with bore 112 in spade portion 111. Connector bolt 114 may be inserted through the bore and into threaded bore 112 during assembly of splice connector 100.

As shown in FIG. 1A, each of the prepared power cables 104 may further include an adapter 138 disposed rearwardly relative to crimp connector 130. Adapter 138 may be affixed to power cable 104-$x$ and may provide a frictional engagement with a rearward portion of cable receptacle 116-$x$. In one implementation, adapter 138 may be formed of an insulative material, such as rubber or epoxy.

In one exemplary implementation, power cable splicing connector 100 may include a voltage detection test point assembly 140 for sensing a voltage in splicing connector 100. Voltage detection test point assembly 140 may be configured to allow an external voltage detection device, to detect and/or measure a voltage associated with splicing connector 100.

For example, as illustrated in FIG. 1A, voltage detection test point assembly 140 may include a test point terminal 142 embedded in a portion of yoke inner housing 122 and extending through an opening within yoke outer shield 120. In one exemplary embodiment, test point terminal 142 may be formed of a conductive metal or other conductive material. In this manner, test point terminal 142 may be capacitively coupled to the electrical conductor elements (e.g., central conductor 106) within splicing connector 100.

Consistent with implementations described herein, a test point cap 144 may sealingly engage portion test point terminal 142 and outer shield 120. In one implementation, test point cap 144 may be formed of a semi-conductive material, such as EPDM compounded with conductive additives. When test point terminal 142 is not being accessed, test point cap 144 may be mounted on test point assembly 140. Because test point cap 144 is formed of a conductive or semi-conductive material, test point cap 144 may ground the test point when in position. Test point cap 144 may include an aperture 146 for facilitating removal of test point cap 144, e.g., using a hooked lineman's tool.

Consistent with implementations described herein, yoke 102 may include a sacrificial appendage 148 projecting therefrom. As shown in FIG. 1A, sacrificial appendage 148 may include a sacrificial conductor extension 150 projecting from central conductor 106. Portions of insulative inner housing 122 and outer housing 120 may be formed around sacrificial conductor extension 150. In one implementation, sacrificial appendage 148 may project substantially perpendicularly from outwardly extending portions 110, so as to be relatively free of encumbrances.

When it is necessary for work to be performed on any of power cables 104 (or devices connected to power cables 104), a worker may cut through sacrificial appendage 148 (e.g., with a hydraulic cable cutter, or similar tool) to ensure that the electrical system that splicing connector 100 is connected to has been properly de-energized and is, therefore, safe to work on. When it is time to re-energize splicing connector 100, yoke 102 may be replaced with a new yoke 102, having an intact sacrificial appendage 148.

Figure 1B:
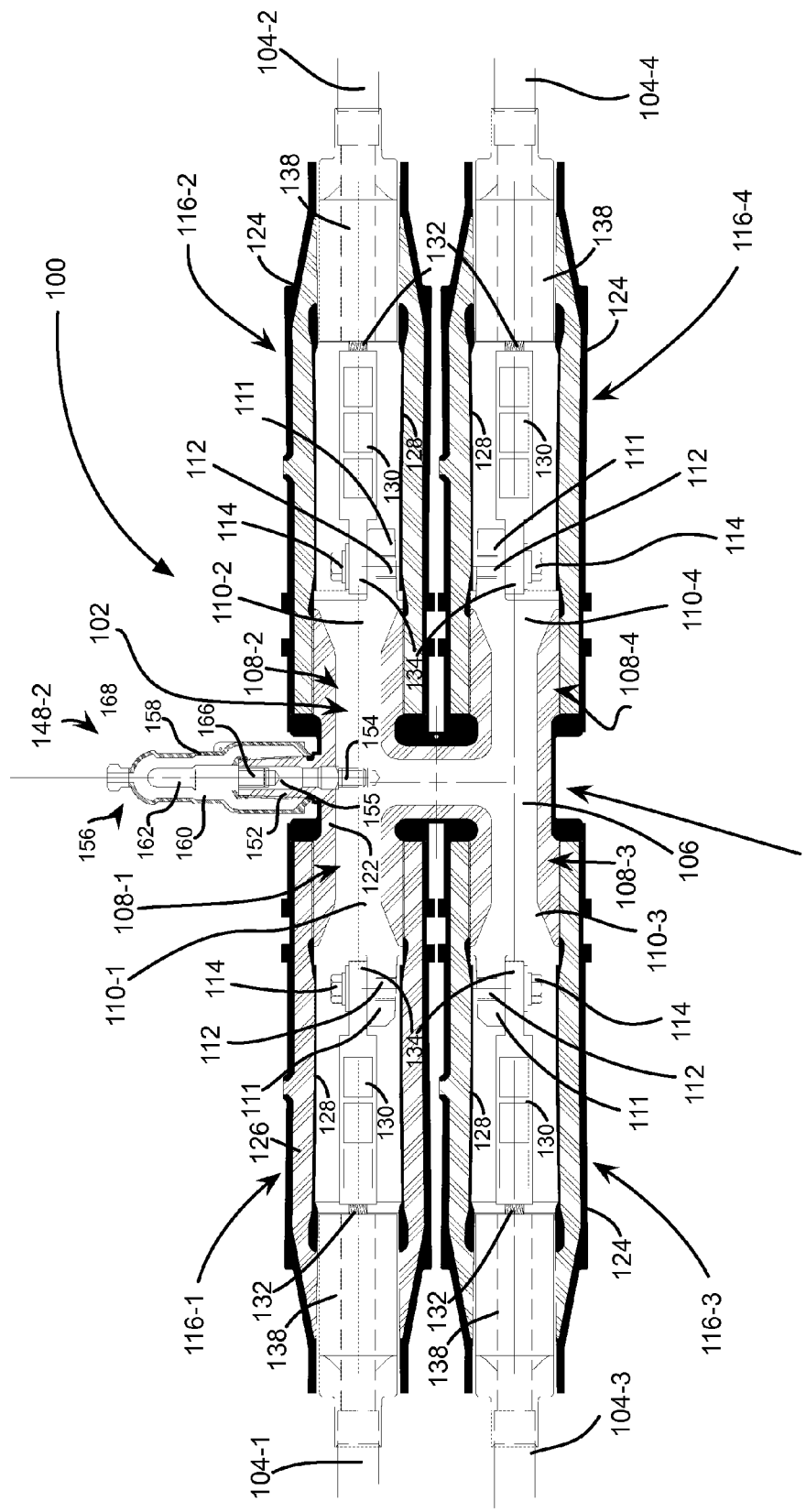
FIG. 1B is a schematic partial cross-sectional diagram illustrating a power cable splicing connector configured in a manner consistent with another implementation described herein.
Figure 1C:
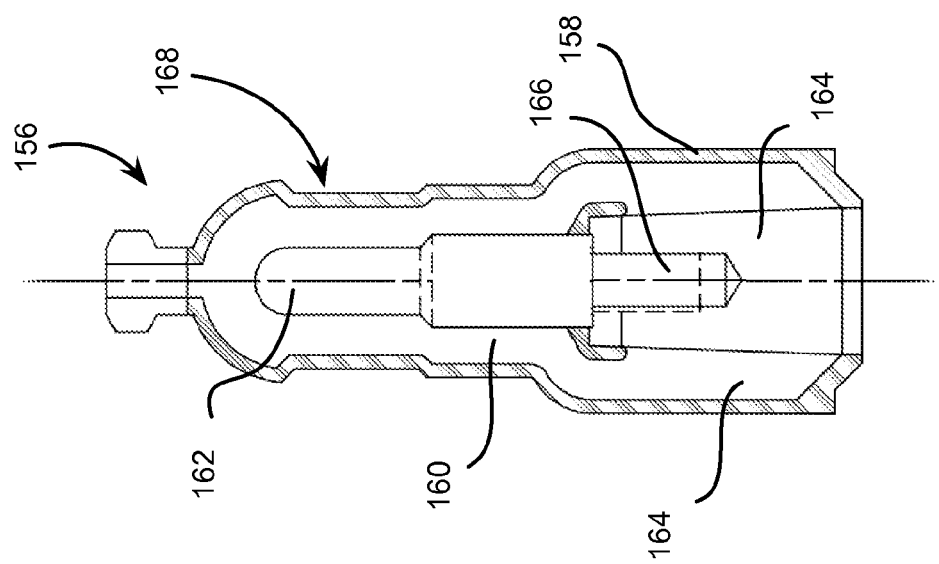
FIG. 1C is a cross-sectional diagram of the sacrificial cap of FIG. 1B.

FIG. 1B is a schematic partial cross-sectional diagram illustrating power cable splicing connector 100 configured in a manner similar to that described above with respect to FIG. 1A. FIG. 1C is a partial cross-sectional diagram illustrating the sacrificial cap of FIG. 1B. Where appropriate, FIGS. 1B and 1C use the same reference numbers to identify the same or similar elements.

As shown in FIGS. 1B and 1C, yoke 102 and the portions of cable splicing connector 100 associated with power cables 104-2 to 104-4 remain substantially similar to the embodiment describe above with respect to FIG. 1A. However, unlike the embodiment of FIG. 1A, sacrificial appendage 148 (referred to as element 148-2 in FIGS. 1B and 1C) may include a modular configuration configured for removable attachment and/or replacement on yoke 102.

As shown in FIG. 1B, yoke 102 may include a sacrificial appendage connection portion 152 projecting outwardly therefrom. In one implementation, sacrificial appendage connection portion 152 may be integrally formed with inner housing 122 and may include a contact 154 provided therein. Contact 154 may extend into a corresponding portion of central conductor 106, such as via a threaded bore provided in central conductor 106. Contact 154 may include a female thread 155 at an outer end thereof for receiving a sacrificial cap 156.

As shown in FIGS. 1B and 1C, sacrificial cap 156 may include an EPDM outer shield 158 and an insulative inner housing 160, typically molded from an insulative rubber or epoxy material. Sacrificial cap 156 may further include a sacrificial conductor 162 received within a rearward portion of inner housing 160. Furthermore, a forward portion of sacrificial cap 156 may include a cavity 164 therein (shown in FIG. 1C) for engaging a projecting portion of sacrificial appendage connection portion 152.

A forward portion of outer shield 158 and inner housing 160 may be configured to surround and protect an interface between sacrificial appendage connection portion 152 and sacrificial conductor 162. In one implementation, a forward end of outer shield 158 and inner housing 160 may be configured to frictionally engage a stepped or notched outer configuration of sacrificial appendage connection portion 152 upon assembly of splicing connector 100, thereby ensuring the electrical integrity of splicing connector 100.

Consistent with implementations described herein, sacrificial conductor 162 may include a conductive threaded male protrusion 166 extending axially therefrom. As described above, the projecting portion of contact 154 may include threaded female cavity 155. Male protrusion 166 may correspond to threaded female portion 155 in contact 154 to couple contact 154 to sacrificial conductor 162, thereby conductively connecting sacrificial conductor 162 to central conductor 106 of yoke 102. In other implementations, the male/female relationship may be reversed.

In one implementation, a cut-through region 168 may be provided in an outer portion of sacrificial cap 156 in a region overlying at least a portion of sacrificial conductor 162. In some implementations, indicia relating to cut-through region 168 may be provided on a surface of outer housing 158 for indicating that a user is to cut through sacrificial cap 156 at cut-through region 168.

When it is necessary for work to be performed on any of power cables 104 (or devices connected to power cables 104), a worker may cut through sacrificial cap 156 at cut-through region 168 (e.g., with a grounded hydraulic cable cutter, or similar tool) to ensure that electrical the system that splicing connector 100 is connected to has been properly de-energized and is, therefore, safe to work on. When it is time to reenergize splicing connector 100, the cut-through sacrificial cap 156 may be removed and a new or replacement sacrificial cap 156 may be installed.

Figure 2A:
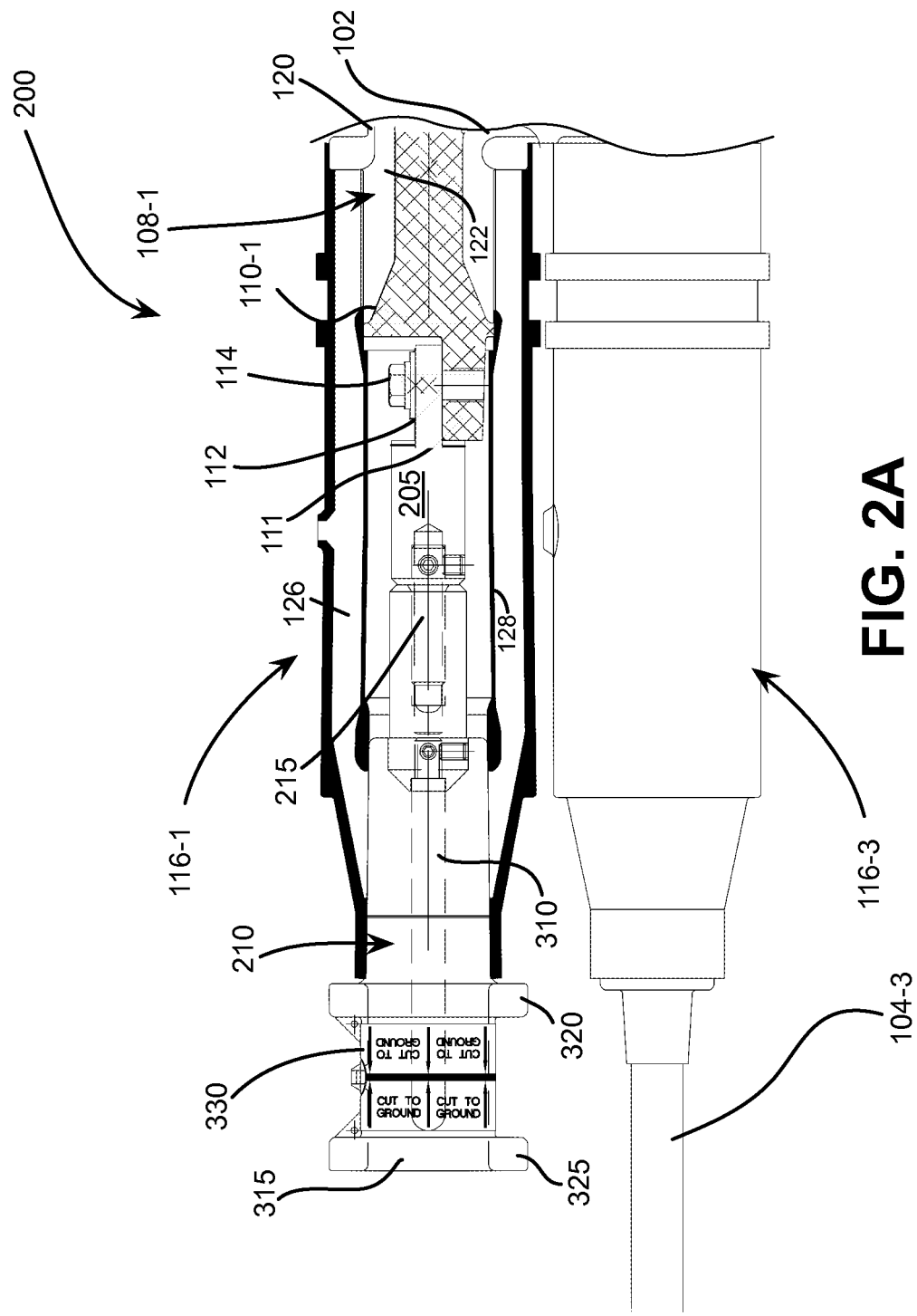
FIG. 2A is a schematic partial cross-sectional diagram illustrating a power cable splicing connector configured in a manner consistent with another implementation described herein.

FIG. 2A is a schematic partial cross-sectional diagram illustrating a power cable splicing connector 200 configured in a manner consistent with another implementation described herein. FIG. 2B illustrates power cable splicing connector 200 in an exploded (e.g., unassembled) view. Where appropriate, FIGS. 2A and 2B use the same reference numbers to identify the same or similar elements.

As shown in FIGS. 2A and 2B, yoke 102 and the portions of cable splicing connector 200 associated with power cables 104-2 to 104-4 remain substantially similar to the embodiment describe above with respect to FIG. 1A. However, unlike the embodiment of FIG. 1A, yoke 102 does not include a sacrificial appendage (e.g., appendage 148) extending therefrom. Rather, as described below, one of splice openings 108-1 to 108-4 (e.g., splice opening 108-1) and the corresponding outwardly extending portion 110 (e.g., extending portion 110-1) may be used to provide a sacrificial appendage or portion to splicing connector 200.

As shown in FIGS. 2A and 2B, a sacrificial adapter spade connector 205 may be connected to spade portion 111 of outwardly extending portion 110-1 via connector bolt 114. Sacrificial adapter spade connector 205 may be configured to provide a releasable attachment mechanism for connecting sacrificial adapter 210 to yoke 102. For example, sacrificial adapter spade connector 205 may include a conductive threaded male protrusion 215 extending axially therefrom in a rearward direction. As described below, sacrificial adapter 210 may include a correspondingly threaded female cavity for conductively securing sacrificial adapter 210 to male protrusion 215. In other implementations, the male/female relationship may be reversed. For example, sacrificial adapter spade connector 205 may include a female threaded cavity for receiving threaded male protrusion 215 extending from sacrificial adapter 210.

As shown in FIGS. 2A and 2B, cable receptacle 116-1 may surround spade extending portion 110-1, spade portion 111, and sacrificial adapter spade connector 205 in a manner similar to that described above with respect to FIG. 1A. For example, cable receptacle 116-1 be substantially cylindrical and may be configured to surround and protect an interface between power sacrificial cable adapter connector 205 and extending portion 110-1. Further, forward end of insert 128 in receptacle 116-1 may be configured to frictionally engage outwardly extending portion 110-1 upon assembly of splicing connector 200, thereby ensuring the electrical integrity of splicing connector 200.

FIG. 3 is a cross-sectional view of sacrificial adapter 210. As shown, sacrificial adapter 210 may have a substantially cylindrical configuration that includes an insulative adapter housing 300, a connector portion 305, a sacrificial bar 310, and a semi-conductive jacket 315. Insulative adapter housing 300 may be formed of, for example, EPDM and may be sized to frictionally engage rearward openings in outer shield 124 and inner insert 128 of cable receptacle 116-1.

Insulative adapter housing 300 may axially surround sacrificial bar 310 and a rearward portion of connector portion 305 so that, upon assembly, sacrificial bar 310 is electrically connected to central conductor 106 of yoke 102 (e.g., via sacrificial adapter spade connector 205). As described briefly above, connector portion 305 may include a threaded cavity therein for receiving threaded male protrusion 215 extending from sacrificial adapter spade connector 205.

Semi-conductive jacket 315 may be formed about a rearward portion of insulative adapter housing 300, such that a portion of sacrificial adapter 210 extending from cable receptacle 116-1 is encased in semi-conductive jacket 315, thereby ensuring electrical continuity on an outer surface of splicing connector 200. As shown in FIGS. 2A-3, semi-conductive jacket 315 may include forward and rearward annular shoulder portions 320 and 325, and a central cut-through portion 330.

In one implementation, forward and rearward annular shoulder portions 320/325 may radially project from a central axis of sacrificial adapter 210 and may provide a means with which to insert sacrificial adapter 210 into cable receptacle 116-1. In addition, as shown in FIG. 2A, forward annular shoulder portion 320 may provide a stop against receptacle 116-1, cut-through portion 330 may be provided in a region between forward annular shoulder portion 320 and rearward annular shoulder portion 325 and may be provided in a region overlying at least a portion of sacrificial bar 310. In some implementations, cut-through portion 330 may be provided with indicia 335 for indicating that a user is to cut through sacrificial adapter 210 at cut-through portion 330.

When it is necessary for work to be performed on any of power cables 104 (or devices connected to power cables 104), a worker may cut through sacrificial adapter 210 at cut-through portion 330 (e.g., with a grounded hydraulic cable cutter, or similar tool) to ensure that the electrical system that splicing connector 200 is connected to has been properly de-energized and is, therefore, safe to work on. When it is time to re-energize splicing connector 200, the cut-through sacrificial adapter 210 may be removed and a new or replacement sacrificial adapter 210 may be installed.

Figure 4A:
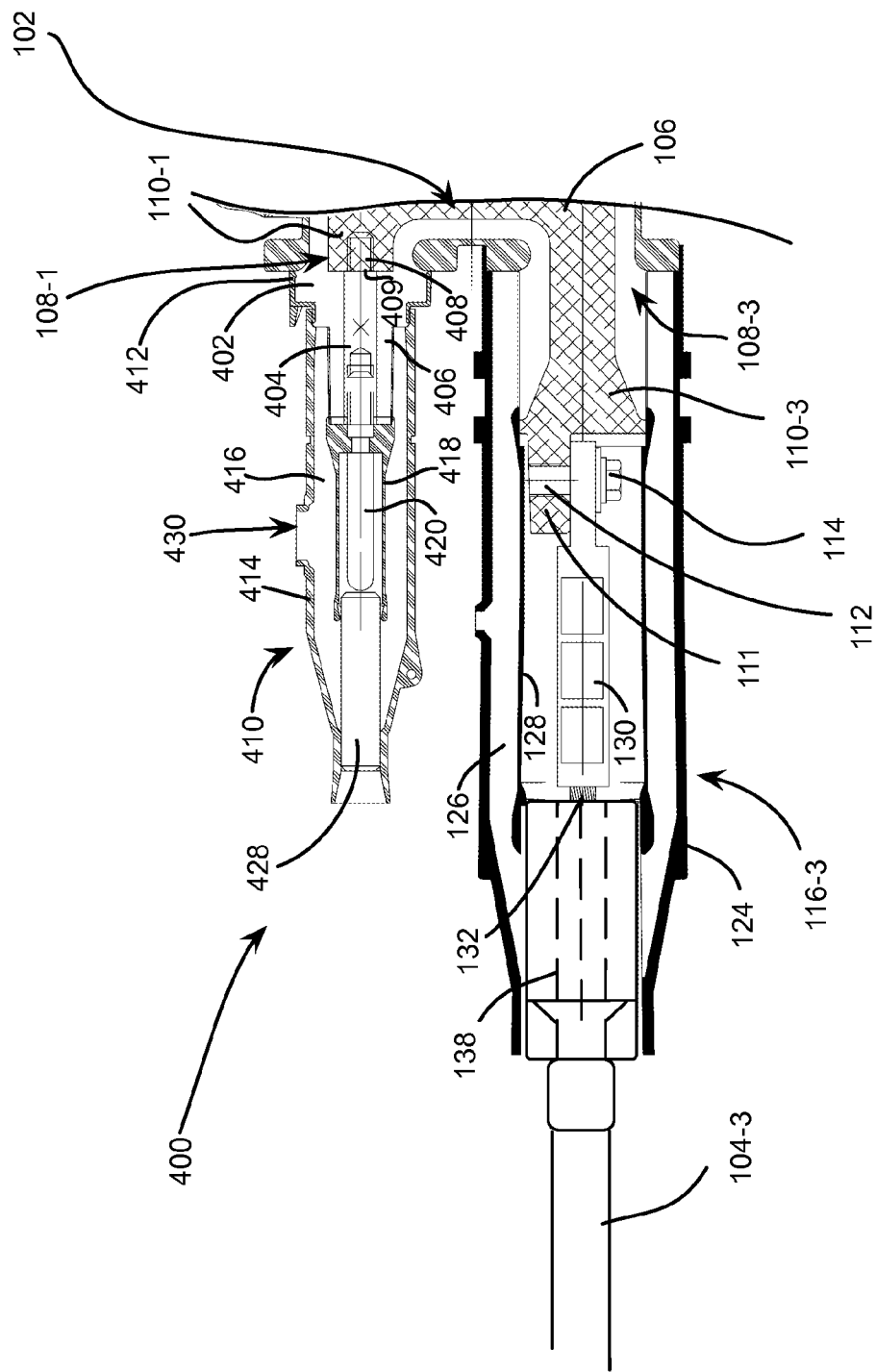
FIG. 4A is a schematic partial cross-sectional diagram illustrating a power cable splicing connector configured in a manner consistent with yet another implementation described herein.
Figure 4B:
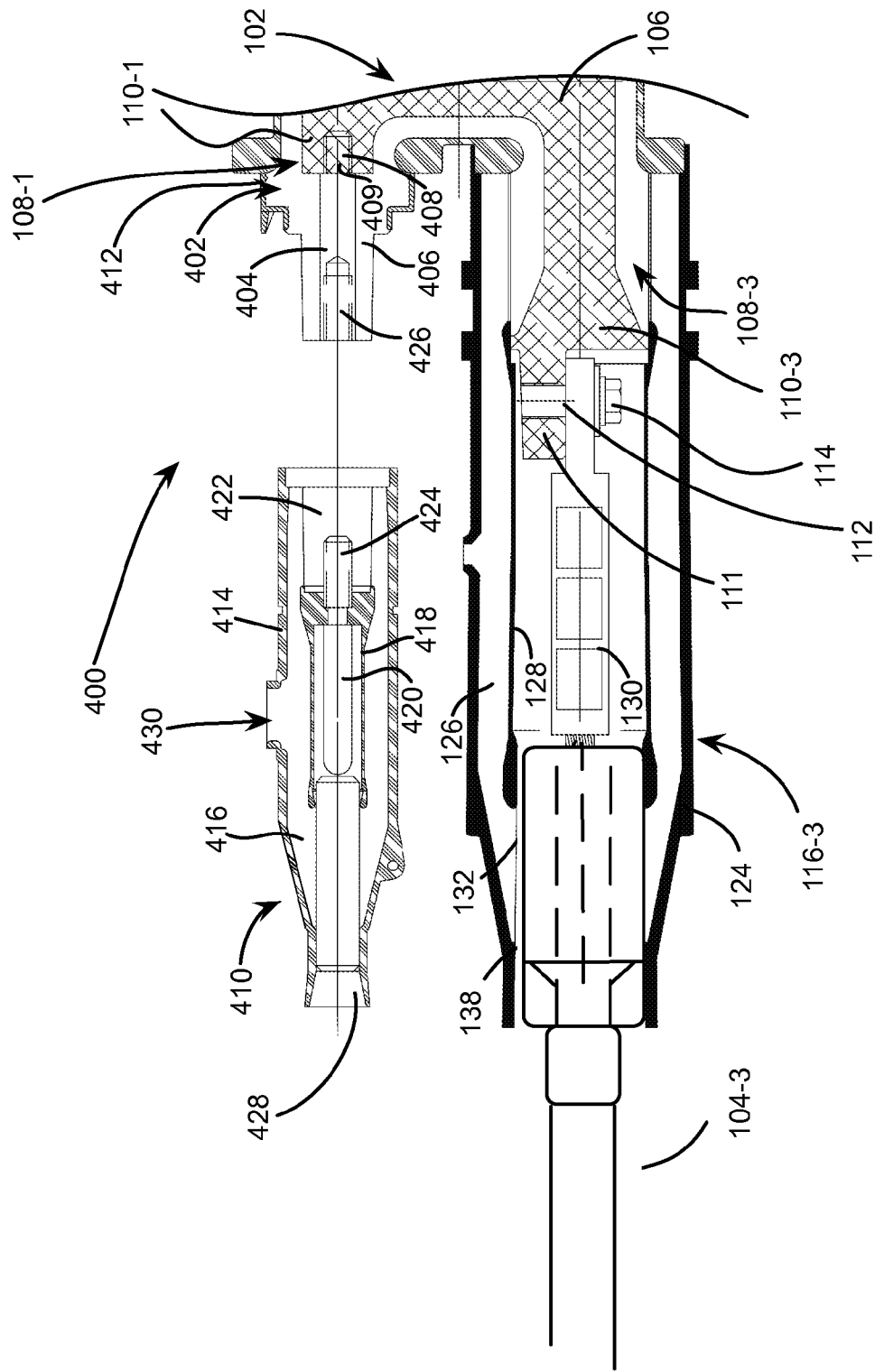
FIG. 4B illustrates the power cable splicing connector of FIG. 4A in an exploded (e.g., unassembled) view.

FIG. 4A is a schematic partial cross-sectional diagram illustrating a power cable splicing connector 400 configured in a manner consistent with yet another implementation described herein. FIG. 4B illustrates power cable splicing connector 400 in an exploded (e.g., unassembled) view. Where appropriate, FIGS. 4A and 4B use the same reference numbers to identify the same or similar elements.

As shown in FIGS. 4A and 4B, yoke 102 and the portions of cable splicing connector 400 associated with power cables 104-2 to 104-4 remain substantially similar to the embodiment described above with respect to FIG. 1A. However, unlike the embodiment of FIG. 1A, yoke 102 does not include a sacrificial appendage extending therefrom. Rather, as described below, one of splice openings 108-1 to 108-4 (e.g., splice opening 108-1) and the corresponding outwardly extending portion 110 (e.g., extending portion 110-1) may be used to provide a sacrificial portion for splicing connector 200.

As shown in FIGS. 4A and 4B, outwardly extending portion 110-1 may include a sacrificial interface 402 connected thereto. Sacrificial interface 402 may include a conductor portion 404 and an insulative portion 406. In one implementation, conductor portion 404 may be conductively coupled to extending portion 110-1, such as via a threaded engagement between conductor portion 404 and outwardly extending portion 110-1 of central conductor 106. For example, extending portion 110-1 may be provided with a female threaded cavity 408 and a forward portion of conductor portion 404 of sacrificial interface 402 may be provided with a corresponding male threaded portion 409. In other implementations, the male/female relationship may be reversed.

Insulative portion 406 of sacrificial interface 402 may radially surround conductor portion 404. As shown, in one implementation, insulative portion 406 may include a stepped outer configuration for sealingly receiving a sacrificial receptacle 410 secured thereon. In one implementation, insulative portion 406 of sacrificial interface 402 may include an outer shield 412 formed from, for example, EPDM.

As shown in FIGS. 4A and 4B, sacrificial receptacle 410 may be configured for releasable and replaceable attachment to yoke 102 following a sacrificial use, as described below. In one implementation, sacrificial receptacle 410 may be based on a non-sacrificial receptacle re-purposed from other products (e.g., 200 Amp deadbreak equipment, etc.). In this manner, a cost savings in manufacturing sacrificial receptacle 410 may be realized.

Sacrificial receptacle 410 may include an EPDM outer shield 414 and an insulative inner housing 416, typically molded from an insulative rubber or epoxy material. Sacrificial receptacle 410 may further include a conductive or semi-conductive insert 418 having a bore formed therethrough. As shown, semi-conductive insert 418 may be configured to receive and surround a sacrificial conductor 420 therein. Furthermore, a forward portion of sacrificial receptacle 410 may include a cavity 422 therein for engaging a rearward portion of sacrificial interface 402.

A forward portion of outer shield 414 and inner housing 416 may be configured to surround and protect an interface between sacrificial interface 402 and sacrificial conductor 420. In one implementation, a forward end of outer shield 414 and inner housing 416 may be configured to frictionally engage the stepped outer configuration of sacrificial interface 402 upon assembly of splicing connector 400, thereby ensuring the electrical integrity of splicing connector 400.

Consistent with implementations described herein, sacrificial conductor 420 may include a conductive threaded male protrusion 424 extending axially therefrom in a forward direction. A rearward portion of sacrificial interface 402 may include a correspondingly threaded female cavity 426 for conductively securing sacrificial interface 402 to sacrificial conductor 420, thereby connecting sacrificial conductor 420 to central conductor 106 of yoke 102. In other implementations, the male/female relationship may be reversed.

A rearward portion of sacrificial receptacle 410 (e.g., the rearward end of the bore semi-conductive insert 418) may be configured to receive an insulative plug 428 therein. As described above, in some implementations, sacrificial receptacle 410 may be re-purposed from an existing receptacle in which the rearward end of the bore is configured for receiving a power cable or other element therein. Because sacrificial receptacle 410 does not connect to a power cable, insulative plug 428 may be provided to effectively seal the opening within the rearward end of sacrificial receptacle 410.

In one implementation, a cut-through region 430 may be provided in an outer surface of sacrificial receptacle 410 in a region overlying at least a portion of sacrificial conductor 420. In some implementations, cut-through region 430 may be provided with indicia for indicating that a user is to cut through sacrificial receptacle 410 at cut-through region 430.

When it is necessary for work to be performed on any of power cables 104 (or devices connected to power cables 104), a worker may cut through sacrificial receptacle 410 at cut-through region 430 (e.g., with a grounded hydraulic cable cutter, or similar tool) to ensure that the electrical system that splicing connector 400 is connected to has been properly de-energized and is, therefore, safe to work on. When it is time to re-energize splicing connector 400, the cut-through sacrificial receptacle 410 may be removed and a new or replacement sacrificial receptacle 410 may be installed.

FIGS. 5A and 5B are cross-section and side views, respectively, of an alternative sacrificial appendage 500 used as an alternative to sacrificial receptacle 410 of FIGS. 4A and 4B. Unlike the embodiment of FIGS. 4A and 4B, sacrificial appendage 500 is not a re-purposed cable receptacle or interface element.

As in the embodiment of FIGS. 4A and 4B, insulative portion 406 of sacrificial interface 402 may include a stepped outer configuration for sealingly receiving sacrificial appendage 500 secured thereon. Sacrificial appendage 500 may be configured for releasable and replaceable attachment to yoke 102 following a sacrificial use, as described below.

Sacrificial appendage 500 may include an EPDM outer shield 505 and an insulative inner housing 510, typically molded from an insulative rubber or epoxy material. Sacrificial appendage 500 may further include a sacrificial conductor 515 received within a rearward portion of inner housing 510. Furthermore, a forward portion of sacrificial appendage 500 may include a cavity 520 therein for engaging a rearward portion of sacrificial interface 402.

A forward portion of outer shield 505 and inner housing 510 may be configured to surround and protect an interface between sacrificial interface 402 and sacrificial conductor 515. In one implementation, a forward end of outer shield 505 and inner housing 510 may be configured to frictionally engage the stepped outer configuration of sacrificial interface 402 upon assembly of splicing connector 400, thereby ensuring the electrical integrity of splicing connector 400.

Consistent with implementations described herein, sacrificial conductor 515 may include a conductive threaded male protrusion 525 extending axially therefrom in a forward direction relative to a remainder of sacrificial conductor 515.

As described above, rearward portion of sacrificial interface 402 may include threaded female cavity 426 for conductively securing sacrificial interface 402 to male protrusion 525 of sacrificial conductor 515, thereby connecting sacrificial conductor 515 to central conductor 106 of yoke 102. In other implementations, the male/female relationship may be reversed.

In one implementation, a cut-through region 530 may be provided in a rearward portion of sacrificial appendage 500 in a region overlying at least a portion of sacrificial conductor 515. In some implementations, indicia relating to cut-through region 530 may be provided on a surface of outer housing 515 for indicating that a user is to cut through sacrificial appendage 500 at cut-through region 530.

When it is necessary for work to be performed on any of power cables 104 (or devices connected to power cables 104), a worker may cut through sacrificial appendage 500 at cut-through region 530 (e.g., with a grounded hydraulic cable cutter, or similar tool) to ensure that electrical the system that splicing connector 400 is connected to has been properly de-energized and is, therefore, safe to work on. When it is time to reenergize splicing connector 400, the cut-through sacrificial appendage 500 may be removed and a new or replacement sacrificial appendage 500 may be installed.

Figure 6A:
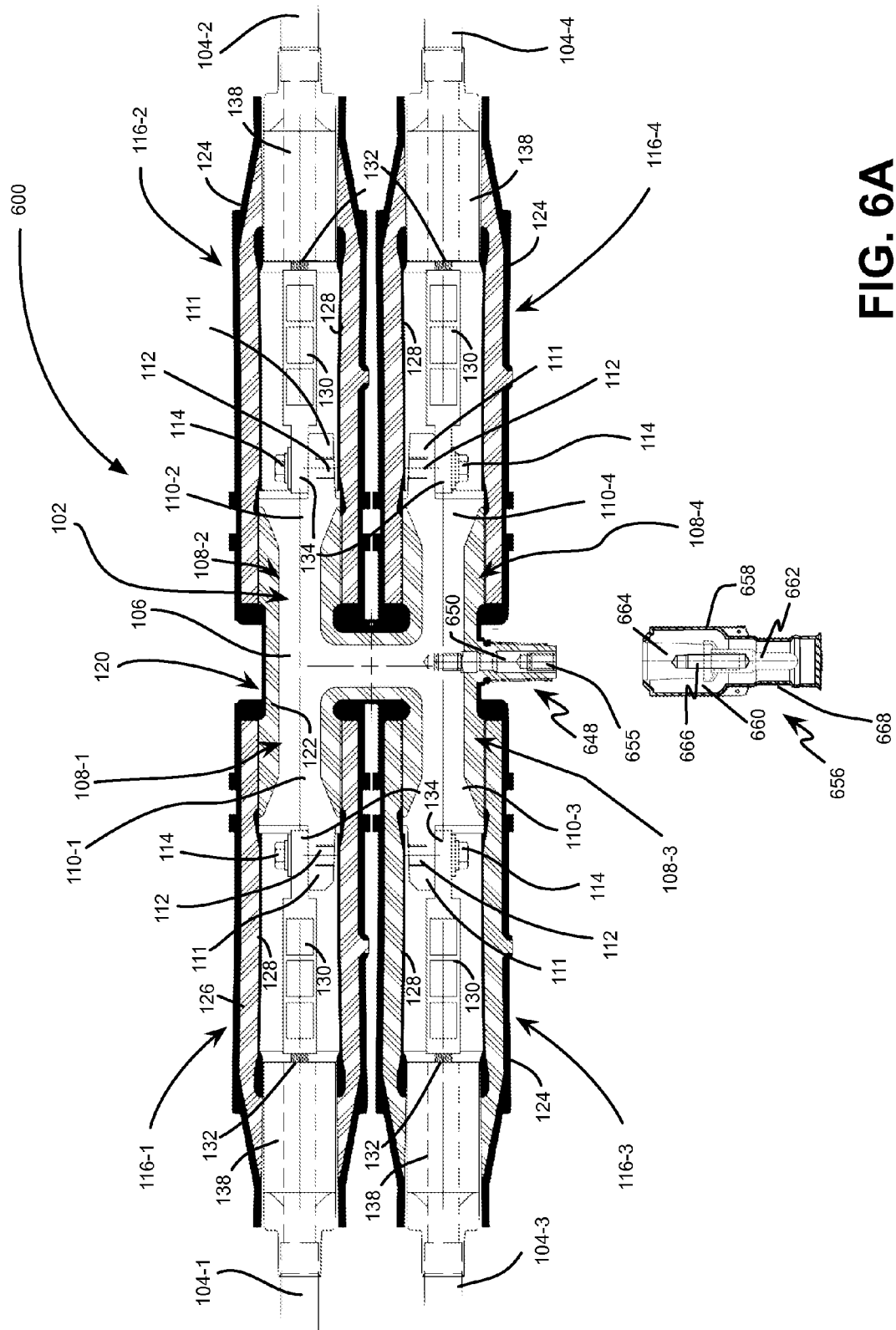
FIG. 6A is a partially exploded, schematic, cross-sectional diagram illustrating another embodiment of a power cable splicing connector configured in a manner consistent with another implementation described herein.
Figure 6B:
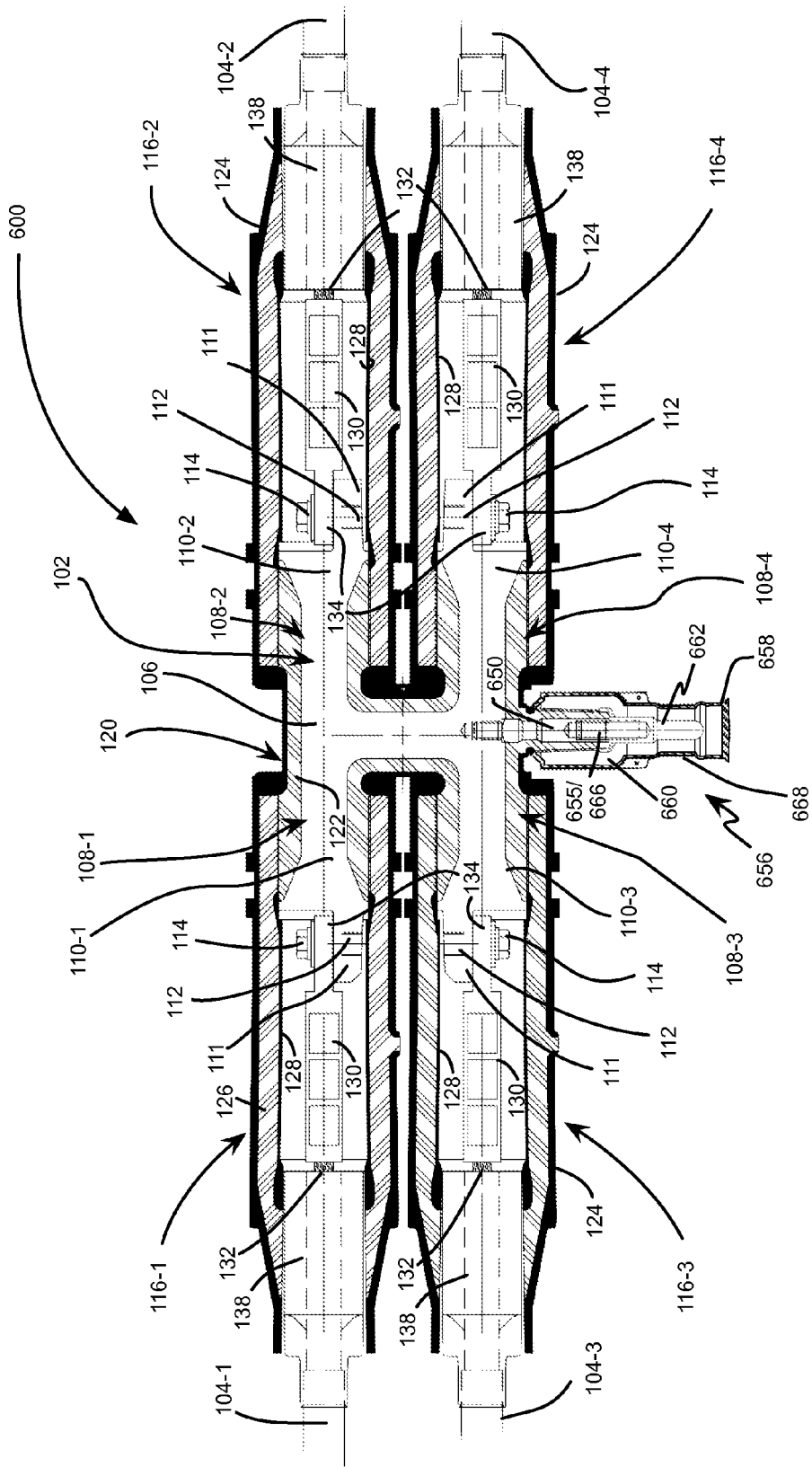
FIG. 6B is a schematic, cross-sectional diagram of the power cable splicing connector of FIG. 6A, in an assembled, non-grounded, configuration.
Figure 6C:
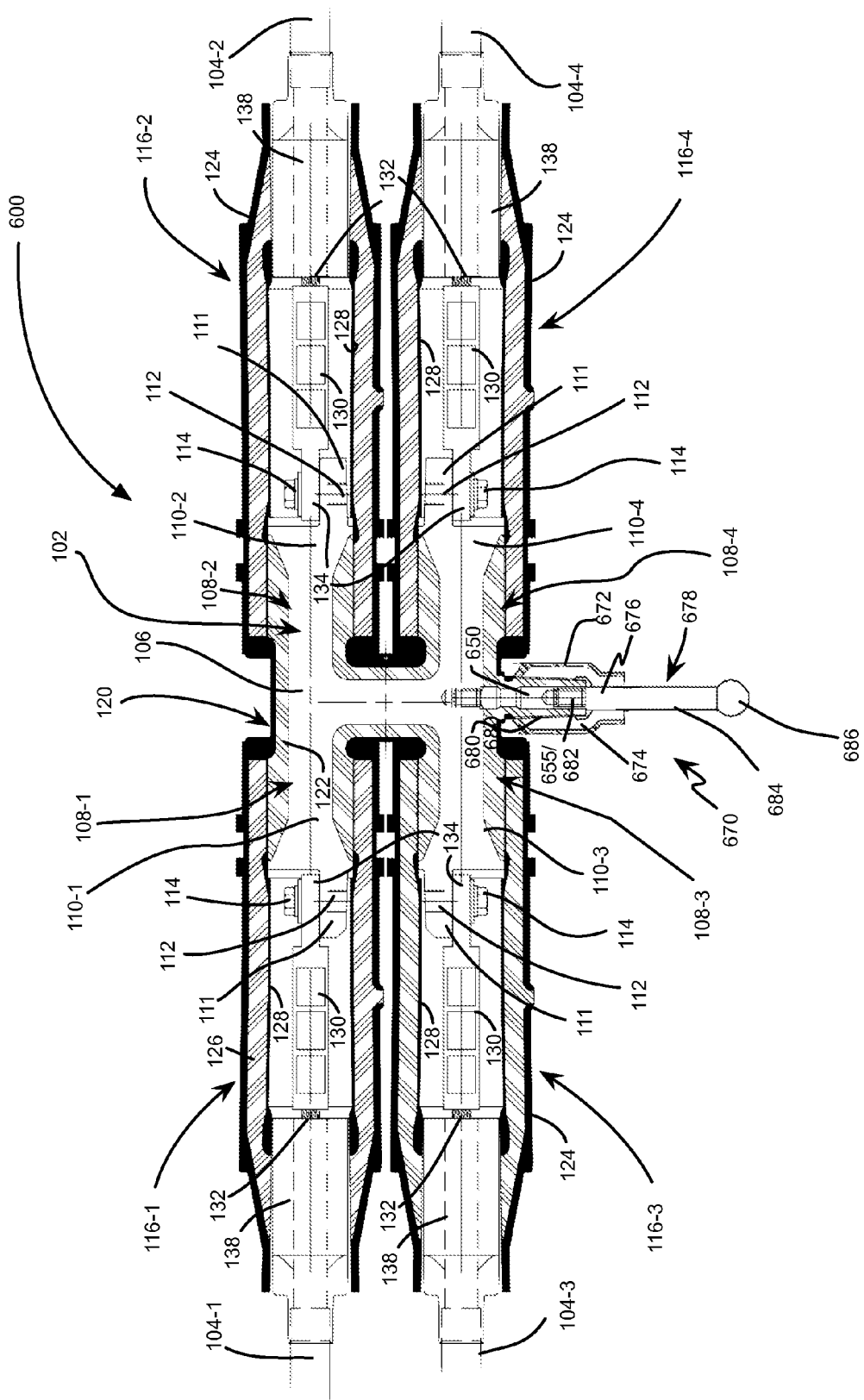
FIG. 6C is a schematic, cross-sectional diagram of the power cable splicing connector of FIG. 6A coupled to a grounding cap consistent with embodiments described herein.

FIG. 6A is a partially exploded, schematic, cross-sectional diagram illustrating power cable splicing connector 600 configured in a manner similar to that described above with respect to splicing connector 100 of FIGS. 1A and 1B. FIG. 6B is a schematic, cross-sectional diagram of power cable splicing connector 600 in an assembled, non-grounded, configuration. FIG. 6C is a schematic, cross-sectional diagram of power cable splicing connector 600 coupled to a grounding cap 670. Where appropriate, FIGS. 6A-6C use the same reference numbers to identify the same or similar elements.

As shown in FIG. 6A, yoke 102 and the portions of cable splicing connector 600 associated with power cables 104-2 to 104-4 remain substantially similar to the embodiment describe above with respect to FIG. 1B. In addition, as shown in FIG. 6A, yoke 102 includes a sacrificial appendage tap 648 configured to receive both a sacrificial cap 656, as shown in FIG. 6B, and a grounding cap 670, as shown in FIG. 6C.

As shown in FIG. 6A, sacrificial appendage tap 648 may be integrally formed with inner housing 122 and configured to include a contact 650 projecting from central conductor 106 in yoke 102. Similar to embodiments described above, a portion of insulative inner housing 122 may be formed around contact 650 so as to encapsulate contact 650 in a tubular manner. As shown, in some embodiments, sacrificial appendage tap 648 may project substantially perpendicularly from outwardly extending portions 110, so as to be relatively free of encumbrances.

As shown in FIGS. 6A-6C, contact 650 may extend into a corresponding portion of central conductor 106, such as via a threaded bore provided in central conductor 106. Furthermore, consistent with embodiments described herein, contact 650 may include a threaded bore 655 at an outer end thereof for receiving a corresponding portion of sacrificial cap 656 as well as a corresponding portion of grounding cap 670, as described below.

As shown in FIGS. 6A and 6B, sacrificial cap 656 may include a semi-conductive EPDM outer shield 658 and an insulative inner housing 660, typically molded from an insulative rubber or epoxy material. Sacrificial cap 656 includes a sacrificial conductor 662 received within a portion of inner housing 660. Furthermore, a portion of sacrificial cap 656 may include a cavity 664 for engaging outer insulative layer 652 of sacrificial appendage tap 648. In one embodiment, outer insulative layer 652 and cavity 664 may be formed in corresponding frustoconical shapes.

As shown in FIGS. 6A and 6B, outer shield 658 and inner housing 660 may be configured to surround and protect an interface between sacrificial appendage tap 648 and sacrificial conductor 662. In one implementation, the ends of outer shield 158 and inner housing 160 adjacent to cavity 664 may be configured to frictionally engage a stepped or notched outer configuration of sacrificial appendage tap 648 upon assembly, thereby ensuring the electrical integrity of splicing connector 600.

Consistent with implementations described herein, sacrificial conductor 662 may include a conductive threaded male protrusion 666 extending concentrically within cavity 664. As described above, contact 650 may include threaded female cavity 655. Male protrusion 666 may correspond to threaded female portion 655 in contact 650 to couple contact 650 to sacrificial conductor 662, thereby conductively connecting sacrificial conductor 662 to central conductor 106 of yoke 102. In other implementations, the male/female relationship may be reversed.

Figure 7:
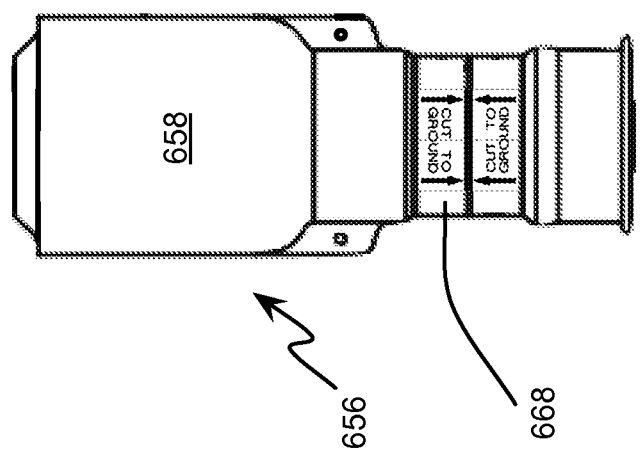
FIG. 7 is a schematic side view of the sacrificial cap of FIGS. 6A and 6B.

In one implementation, sacrificial cap 656 includes a cut-through region 668 provided in a region overlying at least a portion of sacrificial conductor 662. In some implementations, as shown in FIG. 7, indicia relating to cut-through region 668 may be provided on a surface of outer housing 658 for indicating that a user is to cut through sacrificial cap 656 at cut-through region 668.

When it is necessary for work to be performed on any of power cables 104 (or devices connected to power cables 104), a worker may cut through sacrificial cap 656 at cut-through region 668 (e.g., with a grounded hydraulic cable cutter, or similar tool) to ensure that the electrical system that electrical splicing connector 600 is connected to has been properly de-energized and is, therefore, safe to work on. When it is time to reenergize splicing connector 600, the cut-through sacrificial cap 656 may be removed and a new or replacement sacrificial cap 656 may be installed.

In the interim, it may be necessary or desirable to ground power cable splicing connector 600 following cut through of the sacrificial cap 656. Consistent with embodiments described herein, grounding of connector 600 may be accomplished by utilizing grounding cap 670 in conjunction with sacrificial appendage tap 648.

As shown in FIG. 6C, grounding cap 670 may include a semi-conductive EPDM outer shield 672 and an insulative inner housing 674, typically molded from an insulative rubber or epoxy material. Grounding cap 670 includes a conductive core 676 that extends from within a portion of inner housing 674 to a grounding interface portion 678 that projects beyond an end of outer shield 672 and inner housing 674. A portion of grounding cap 670 may include a cavity 680 for engaging outer insulative layer 652 of sacrificial appendage tap 648. In one embodiment, cavity 680 may be formed in frustoconical configuration to correspond to an outer surface of insulative layer 652 of sacrificial appendage tap 648.

As shown in FIG. 6C, outer shield 672 and inner housing 674 of grounding cap 670 may be configured to surround and protect an interface between sacrificial appendage tap 648 and conductive core 676. Consistent with implementations described herein, conductive core 662 may include a conductive threaded male protrusion 682 that extends concentrically within cavity 680. As described above, contact 650 in sacrificial appendage tap 648 may include threaded female cavity 655. Male protrusion 682 may correspond to threaded female portion 655 in contact 650 to couple contact 650 to conductive core 662 of grounding cap 670, thereby conductively connecting grounding interface portion 678 to central conductor 106 of yoke 102. In other implementations, the male/female relationship may be reversed.

As shown in FIG. 6C, in one implementation, grounding interface portion 678 includes both a clamp engaging portion 684 for engaging a grounding clamp, such as a hot line clamp (described below in relation to FIGS. 9A and 9B) and a ball end 686 for engaging a suitably sized ball socket clamp (described below in relation to FIGS. 10A and 10B). For example, clamp engaging portion 684 may include a substantially cylindrical or rectangular configuration. In other implementations, grounding interface portion 678 may include either of these elements individually.

Conductive core 662 and grounding interface 678 may be formed as one element of conductive material, such as copper, brass, steel, or aluminum. In other implementations, grounding interface 678 may be initially separate from a secured to conductive core 662 during assembly of grounding cap 670.

Figure 8:
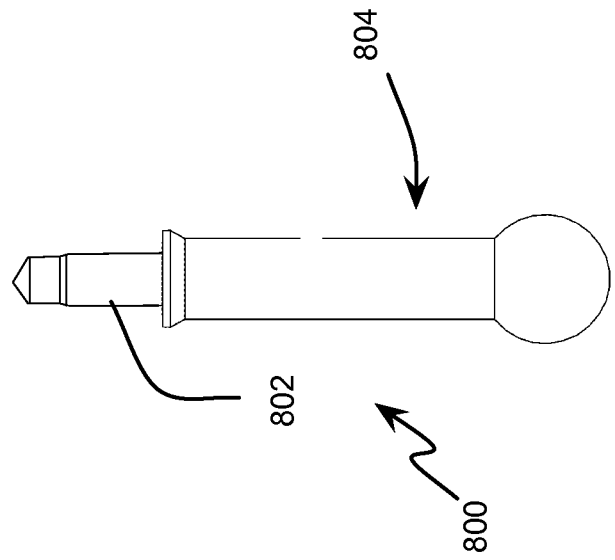
FIG. 8 is a schematic side view of a grounding pin for use with the power cable splicing connector of FIG. 6A.

Consistent with yet another embodiment, as shown in FIG. 8, a conductive grounding pin 800 may be used in place of grounding cap 670 described above. As shown in FIG. 8, grounding pin 800 may include a tap engaging portion 802 and clamp engaging portion 804. For example, tap engaging portion 802 may include a male threaded end configured to mate with threaded female portion 655 in contact 650. Clamp engaging portion 804 may be formed similar to grounding interface portion 678 described above in relation to FIG. 6C. In some embodiments, an end of clamp engaging portion 804 may include a tool engaging interface (not shown), such as a Phillips head interface, or a Allen-type hexagonal female interface for receiving a tool for securing grounding pin 800 to contact 650. In other embodiments, the tool engaging interface may be provided in an outer surface of an intermediate portion of grounding pin 800, such as a region between tap engaging portion 802 and clamp engaging portion 804. In such a configuration, grounding pin 800 may be secured to connector 600 using a wrench or hexagonal socket.

Figure 9A:
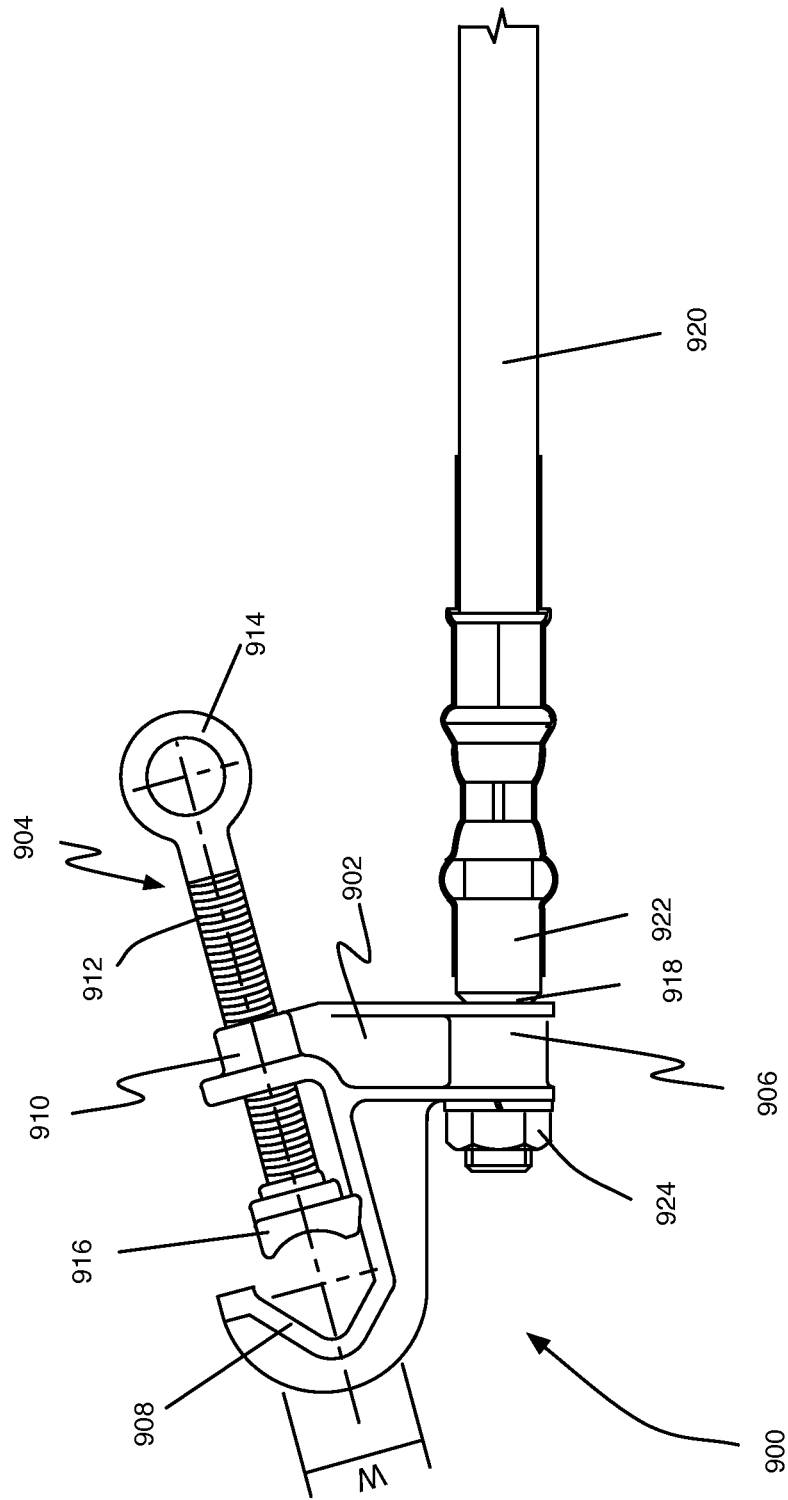
FIG. 9A is a schematic side view of an exemplary hot line clamp.
Figure 9B:
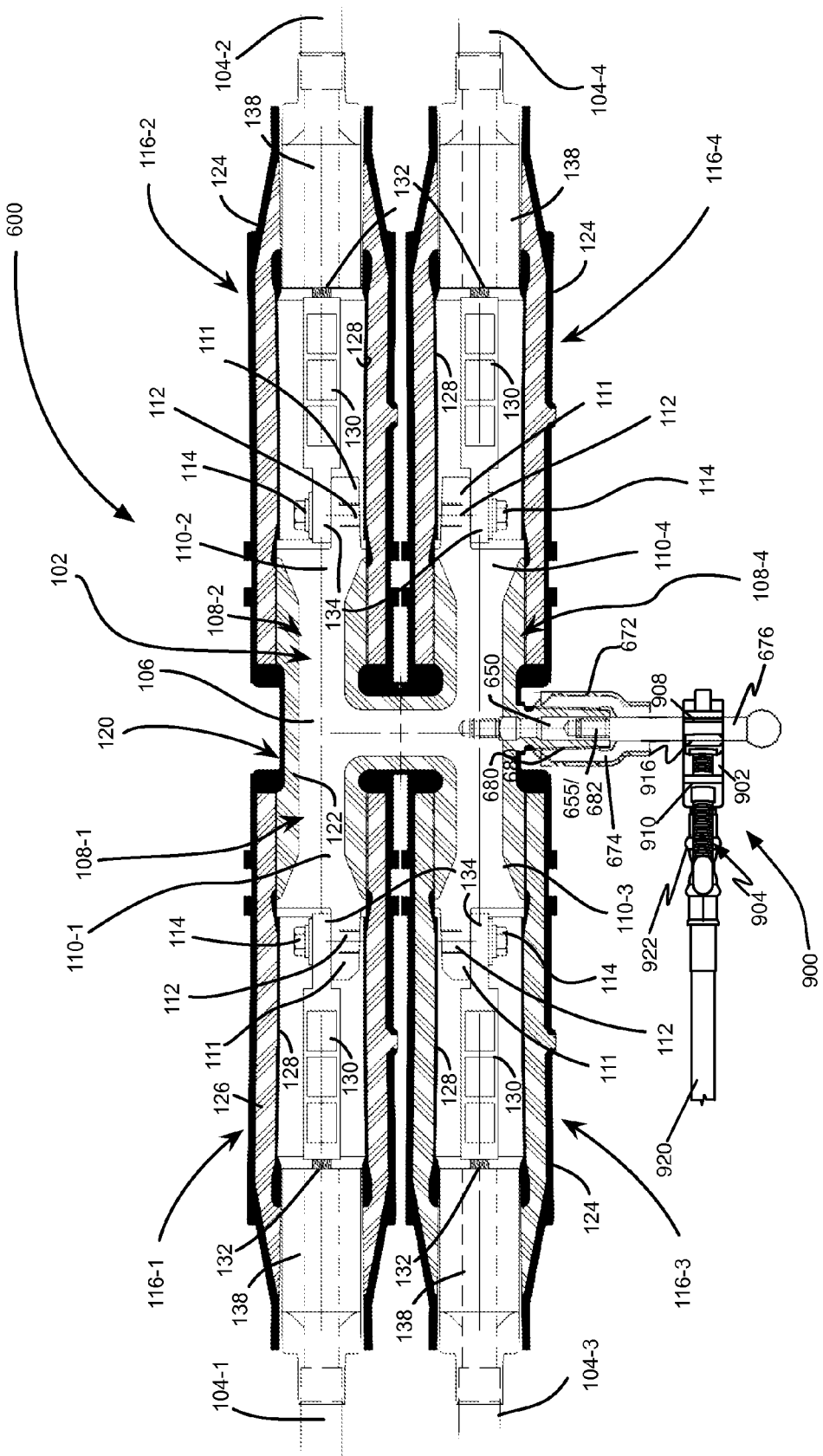
FIG. 9B is a schematic top view of the hot line clamp of FIG. 9A coupled to the grounding cap of FIG. 6C.

FIG. 9A is a schematic side view of an exemplary hot line clamp 900. FIG. 9B is a schematic side view of hot line clamp 900 coupled to electrical splicing connector 600 in a manner consistent with embodiments described herein.

Referring to FIG. 9A, in one exemplary implementation, hot line clamp 900 includes a conductive body 902, a clamping member 904, and a ground line attachment portion 906. Conductive body 902 may be formed of a conductive metal, such as brass or aluminum and may include a generally v or c-shaped region 908 for receiving a portion of clamp engaging end 684 of conductive core 662 (or clamp engaging portion 804 of grounding pin 800). For example, a width "W" may be substantially similar, yet slightly larger than an outside diameter of clamp engaging portion 684. With such a configuration, v-shaped region 908 may easily slip onto exposed clamp engaging end 684 upon installation of grounding cap 670 onto sacrificial appendage tap 648 in the manner described above.

As shown in FIG. 9A, conductive body 902 may include an opposing portion 910 projecting from body 902 in a location opposing v-shaped region 908. Opposing portion 910 includes a threaded aperture therethrough configured to receive clamping member 904, such that clamping member is positioned in clamping relation to v-shaped region 908.

Clamping member 904, in one exemplary embodiment, includes a generally cylindrical, threaded body 912 having a tool engaging portion 914 on one end and a part engagement portion 916 on an opposing end, distal from tool engaging portion 914. During assembly of hot line clamp 900, body 912 is threaded through opposing portion 910 such that part engagement portion 916 opposes v-shaped region 908.

As shown in FIG. 9B, during connection of hot line clamp 900 to electrical splicing connector 600, v-shaped region 908 of conductive body 902 is placed over the exposed clamp engaging end 684 of grounding cap 670. Tool engaging portion 914 of clamping member 904 is then rotated, e.g., using a lineman's hook, causing part engaging portion 916 to travel toward v-shaped region 908, thus securing clamp engaging end 684 of grounding cap 670 within hot line clamp 900.

Returning to FIG. 9A, conductive body 902 of hot line clamp 900 also includes an aperture 918 for receiving ground line attachment portion 906. Ground line attachment portion 906 may include a mechanism for securing a ground line 920 to, for example, a threaded lug 922. In one implementation, ground line attachment portion 906 may include a crimp style connector for securing ground line 920 to lug 922. As shown in FIG. 9A, lug 922 may be inserted into aperture 918 in conductive body 902 and secured using nut 924.

Figure 10A:
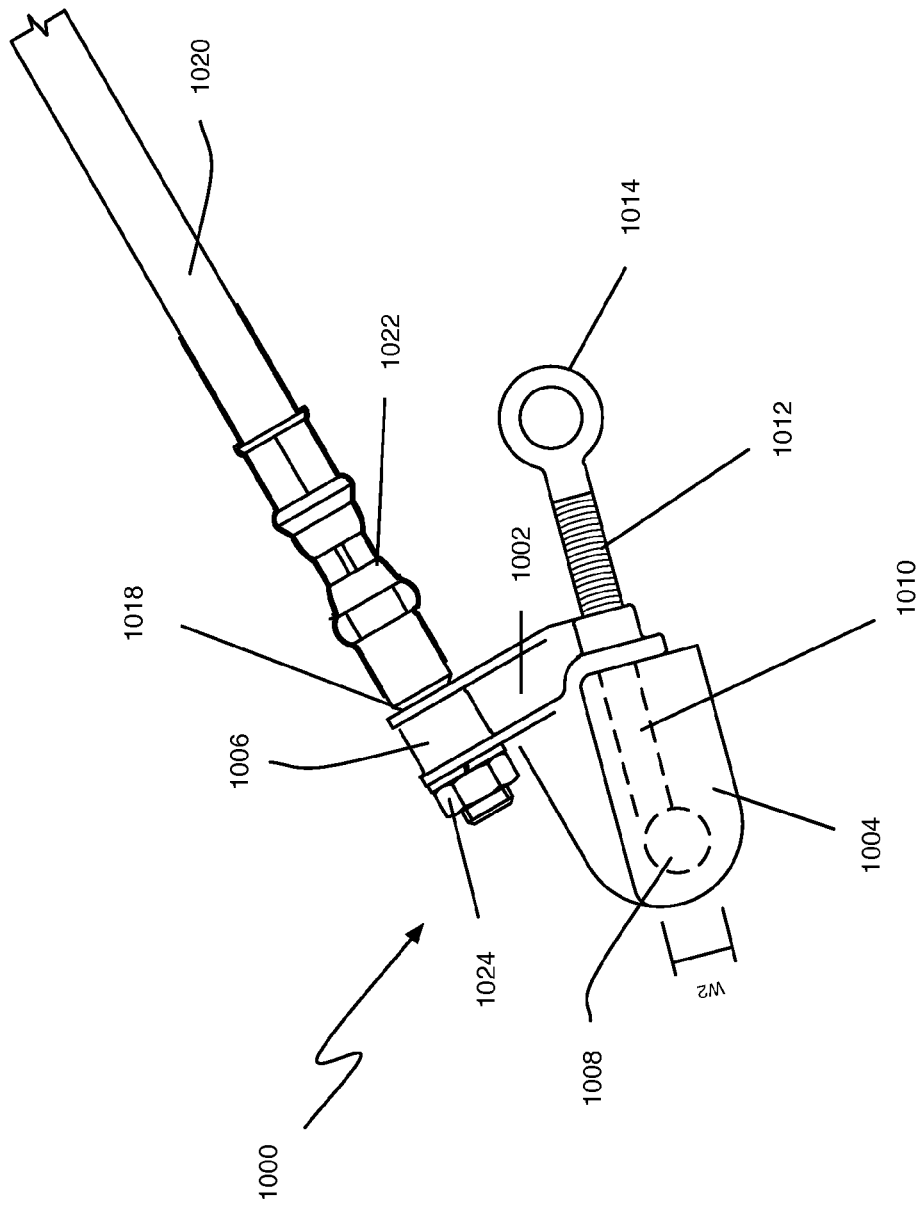
FIG. 10A is a schematic side view of an exemplary ball socket hot line clamp.

FIG. 10A is a schematic side view of an exemplary ball socket clamp 1000. FIG. 10B is a schematic side view of ball socket clamp 1000 coupled to electrical splicing connector 600 in a manner consistent with embodiments described herein.

Referring to FIG. 10A, in one exemplary implementation, ball socket clamp 1000 includes a conductive body 1002, a clamping member 1004, and a ground line attachment portion 1006. Conductive body 1002 may be formed of a conductive metal, such as brass or aluminum and may include a socket portion 1008 formed therein for receiving ball end 686 of grounding interface 678. For example, a width "W2" may be substantially similar, yet slightly larger than an outside diameter of ball end 686. With such a configuration, socket portion 1008 may easily slip onto exposed ball end 686 following installation of grounding cap 670 onto sacrificial appendage tap 648.

As shown in FIG. 10A, conductive body 1002 may include a threaded aperture 1010 for receiving clamping member 1004, such that clamping member 1004 is positioned in clamping relation to socket portion 1008. Clamping member 1004, in one exemplary embodiment, includes a generally cylindrical, threaded body 1012 having a tool engaging portion 1014 on one end and a ball engaging portion (not shown) on an opposing end, distal from tool engaging portion 1014. During installation of ball socket clamp 1000, body 1012 is threaded through aperture 1010 such that the ball engaging portion engages ball end 686 of grounding interface 678.

Figure 10B:
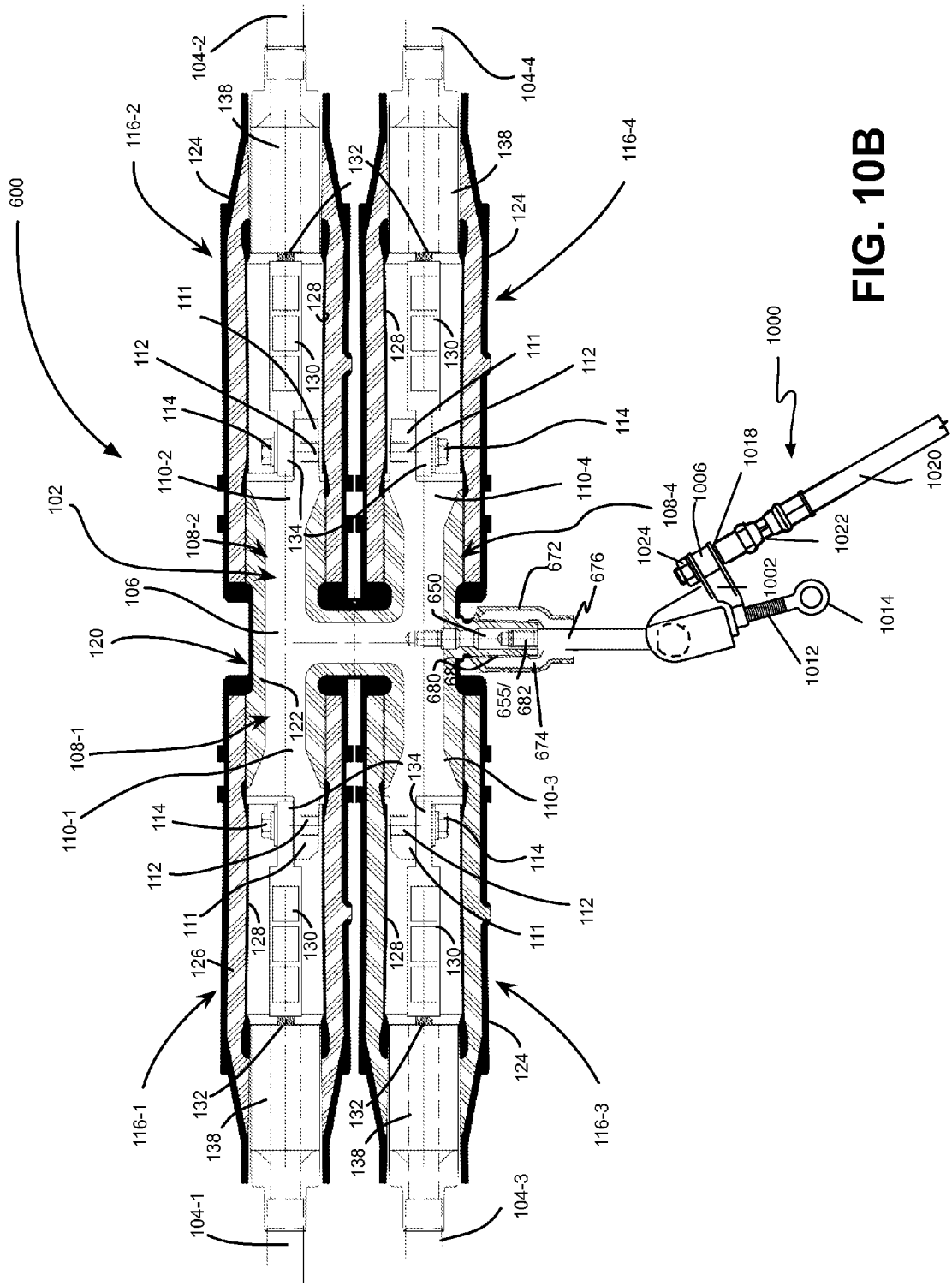
FIG. 10B is a schematic top view of the ball socket hot line clamp of FIG. 10A coupled to the grounding cap of FIG. 6C.

As shown in FIG. 10B, during connection of ball socket clamp 1000 to grounding interface 678, socket portion 1008 of conductive body 1002 is placed over exposed ball end 686 of grounding interface 678. Tool engaging portion 1014 of clamping member 1004 is then rotated, e.g., using a lineman's hook, causing the ball engaging portion to travel toward socket portion 1008, thus securing ball end 686 of grounding interface 678 within ball socket clamp 1000.

As shown in FIGS. 10A and 10B, conductive body 1002 of ball socket clamp 1000 also includes an aperture 1018 for receiving ground line attachment portion 1006. Ground line attachment portion 1006 may include a mechanism for securing a ground line 1020 to, for example, a threaded lug 1022. In one implementation, ground line attachment portion 1006 may include a crimp style connector for securing ground line 1020 to lug 1022. Lug 1022 may be inserted into aperture 1018 in conductive body 1002 and secured using nut 1024.

When it is no longer necessary to ground electrical splicing connector 600, clamp 900/1000 is removed from grounding cap 670 (or grounding pin 800) and grounding cap 670 (or grounding pin 800) is removed from sacrificial appendage tap 648. Then, a replacement sacrificial cap 656 is installed into sacrificial appendage tap 648. At this point, electrical splicing connector 600 may be safely re-energized.

By providing an effective and safe mechanism for establishing demonstrative evidence of a de-energized system/circuit in an electrical connector and providing an efficient grounding mechanism, various personnel may be more easily able to safely identify and confirm a de-energized condition and subsequently ground a switchgear assembly. More specifically, consistent with aspects described herein, personnel may be able to create and view a physical disconnect of a connected portion of the electrical system without damaging (and necessarily replacing) connected power cables or other components.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, implementations described herein may also be used in conjunction with other devices, such as high voltage switchgear equipment, including 19 B kV, 29 B kV, or 39 B kV equipment.

For example, various features have been mainly described above with respect to electrical splicing connectors. In other implementations, other medium/high voltage power components may be configured to include the sacrificial appendage/adapter configurations described above.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An electrical connector assembly, comprising:
    a yoke, comprising:
        an outer housing; and
        a central conductor provided within the outer housing, wherein the central conductor comprises at least three outwardly extending portions,
    wherein a first outwardly extending portion and a second outwardly extending portion are operatively coupled to first and second power cables, respectively, and
    wherein a third outwardly extending portion comprises a tap configured to interchangeably interface with a sacrificial appendage and a grounding element,
    wherein, when the sacrificial appendage is installed on the tap, the sacrificial appendage is configured to be cut through to confirm that the electrical connector assembly is de-energized, and
    wherein, when the grounding element is installed on the tap, the grounding element is configured for attachment to a grounded hot line clamp to ground the electrical connector assembly.

2. The electrical connector assembly of claim 1, wherein the sacrificial appendage comprises a sacrificial cap, and wherein the yoke is configured to releasably retain each of the sacrificial cap and the grounding element in conductive contact with the tap.

3. The electrical connector assembly of claim 2, wherein the sacrificial cap includes an insulated outer body and a sacrificial conductor configured to conductively communicate with the central conductor of the yoke.

4. The electrical connector assembly of claim 3, wherein the sacrificial cap comprises a cavity for receiving an insulated outer portion of the tap.

5. The electrical connector assembly of claim 3, wherein at least portions of the outer housing of the yoke and the outer body of the sacrificial cap comprise a semi-conductive outer shield.

6. The electrical connector assembly of claim 3, wherein the sacrificial cap comprises a cut-through portion that includes at least a portion of the sacrificial conductor.

7. The electrical connector assembly of claim 6, wherein the outer body of the sacrificial cap comprises graphical indicia indicating a location of the cut-through portion.

8. The electrical connector assembly of claim 1, wherein the grounding element comprises:
    a grounding cap comprising:
        an insulated body; and
        a conductive core extending through the insulated body, wherein the conductive core is configured to conductively communicate with the central conductor of the yoke, and
        wherein a portion of the conductive core projects beyond the insulated body to form a grounding interface portion.

9. The electrical connector assembly of claim 8, wherein the insulated body of the grounding cap comprises a cavity for receiving an insulated outer portion of the tap.

10. The electrical connector assembly of claim 8, wherein the tap of the yoke and the conductive core of the grounding cap comprise mating threaded interfaces for securing the grounding cap to the tap.

11. The electrical connector assembly of claim 8, wherein the grounding interface portion comprises a generally cylindrical configuration for engaging clamping members of the hot line clamp.

12. The electrical connector assembly of claim 8, wherein the grounding interface portion comprises a ball configuration for engaging a ball socket in the hot line clamp.

13. The electrical connector assembly of claim 1, wherein the grounding element comprises:
    a grounding pin comprising:
        a tap engaging portion configured to conductively communicate with the central conductor of the yoke, and
        a clamp engaging portion configured to engage the hot line clamp.

14. The electrical connector assembly of claim 13, wherein the tap of the yoke and the tap engaging portion of the grounding pin comprise mating threaded interfaces for securing the grounding pin to the tap.

15. The electrical connector assembly of claim 14, wherein the grounding pin comprises a tool engaging portion to facilitate coupling of the grounding pin to the tap.

16. The electrical connector assembly of claim 13, wherein the clamp engaging portion comprises at least one of a cylindrical configuration or a ball configuration for engaging the hot line clamp.

17. The electrical connector assembly of claim 1, wherein the yoke comprises a three-way yoke, a four-way yoke, or a two-way yoke.

18. A medium or high voltage electrical connector assembly, comprising:
a yoke, comprising:
an insulated inner housing;
a semi-conductive outer shield; and
a central conductor provided within the inner housing, wherein the central conductor comprises:
at least two outwardly extending portions for engaging load power cables or supply power cables; and
a tap portion that projects from the outer shield of the yoke for interchangeably engaging a sacrificial cap and a grounding element,
wherein a portion of the insulated inner housing surrounds the tap portion in a tubular manner to engage a respective portion of the sacrificial cap,
wherein the sacrificial cap includes an insulated body, a semi-conductive outer shield, and a sacrificial conductor configured to conductively communicate with the central conductor of the yoke via the tap portion,
wherein the sacrificial cap comprises a cut-through portion that includes at least a portion of the sacrificial conductor,
wherein the grounding element includes a substantially cylindrical conductor configured to engage the tap portion and a hot line clamp for grounding the electrical connector assembly.

19. The medium or high voltage electrical connector assembly of claim 18, wherein the grounding element comprises:
a grounding cap comprising:
an outer housing; and
wherein the substantially cylindrical conductor extends through the outer housing to form an exposed clamp engaging portion, and
wherein the outer housing comprises a cavity for engaging the portion of the insulated inner housing that surrounds the tap portion.

20. The medium or high voltage electrical connector assembly of claim 13, wherein the substantially cylindrical conductor of the grounding element comprises a ball end for engaging a ball socket in the hot line clamp.

\* \* \* \* \*